Patented Nov. 24, 1931

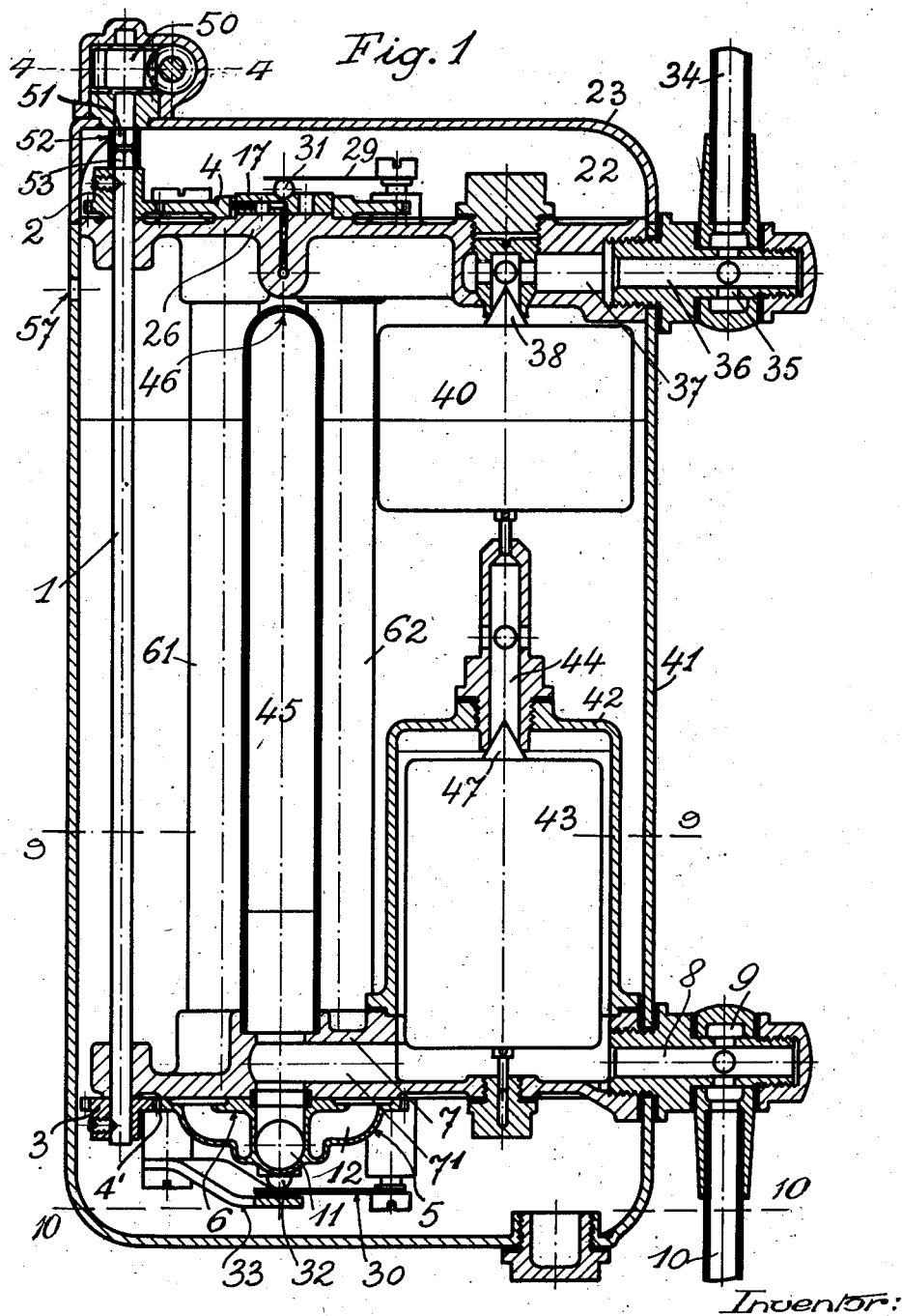

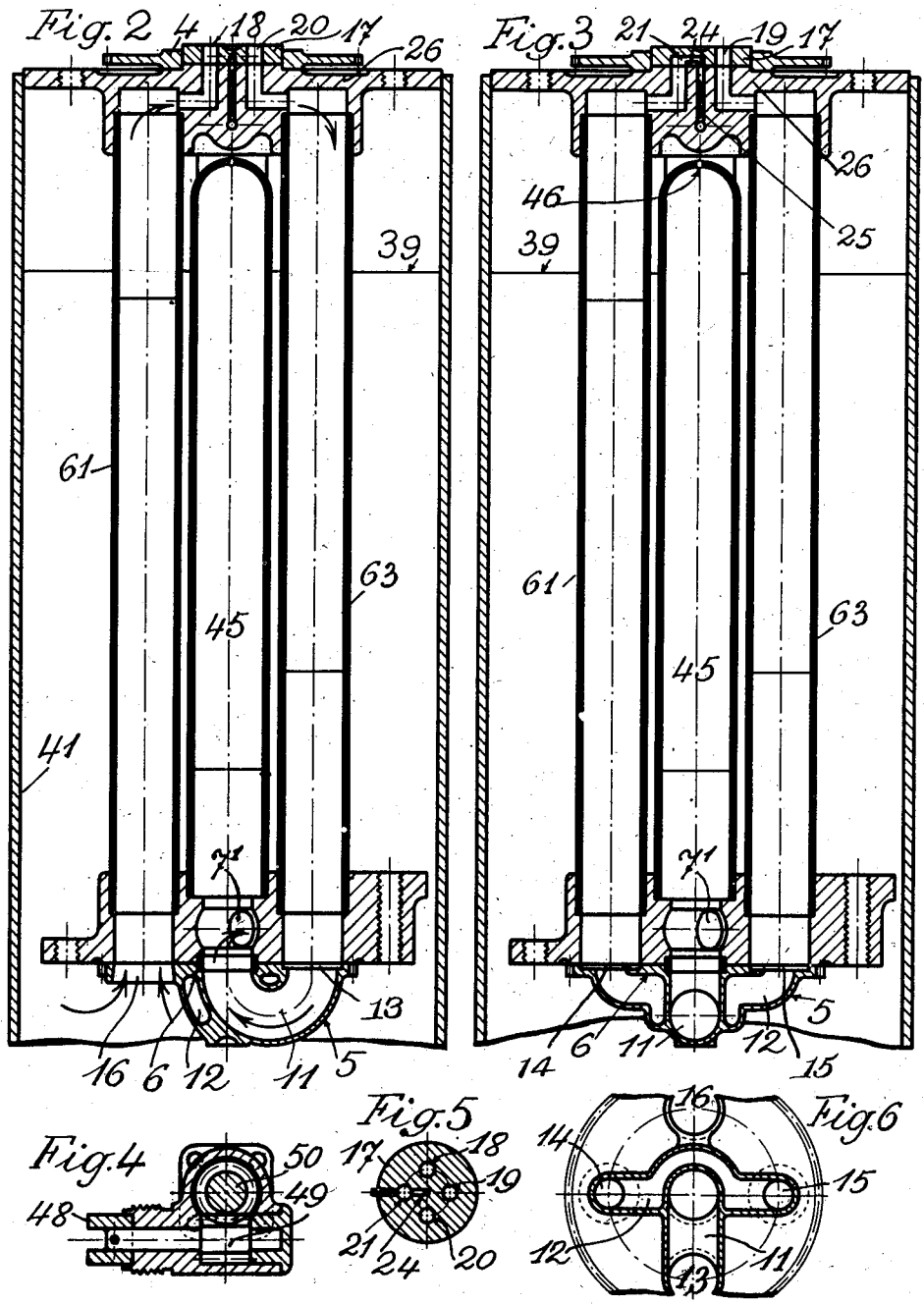

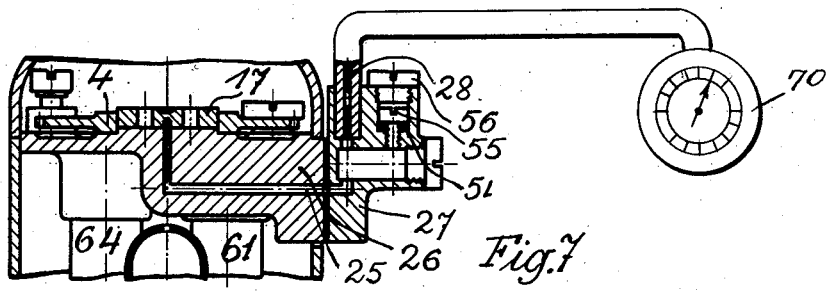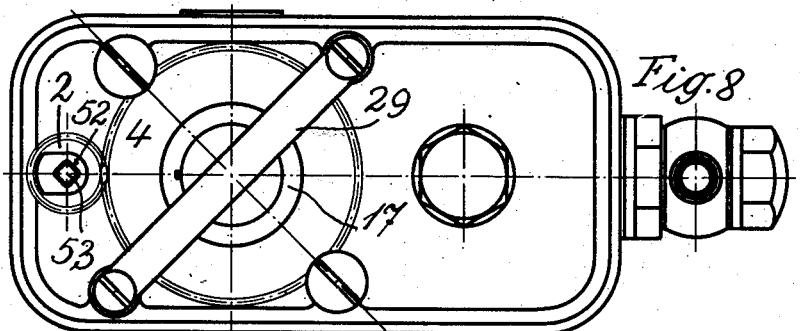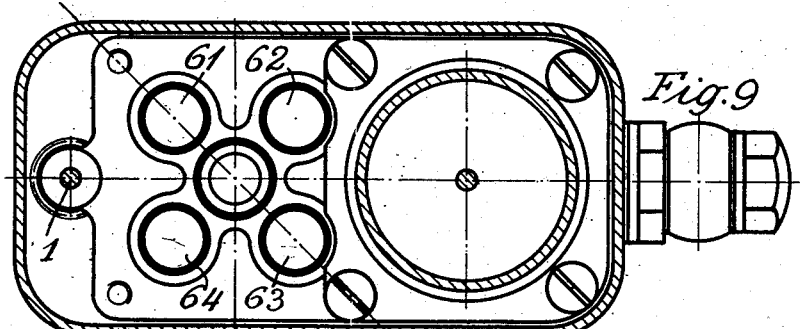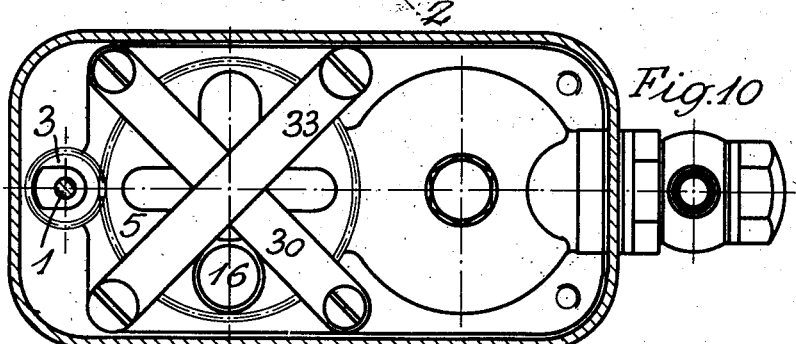

1,833,832

UNITED STATES PATENT OFFICE

WILLIAM EMILE FAVRE, OF GENEVA, SWITZERLAND

APPARATUS FOR INDICATING THE CONSUMPTION OF LIQUIDS

Application filed April 22, 1929, Serial No. 357,177, and in France May 22, 1928.

Apparatus are known for indicating the rate of flow or consumption or delivery of a fluid as a function of a variable, for instance for continuously indicating during the running of a motor car the amount of fuel being used per unit of distance travelled, that is to say, the amount of fuel used per mile travelled. An apparatus devised by myself is composed of a combination of two to four non-horizontal tubes working continuously and successively at each of the three following operations: (1) filling the tubes with liquid through the base by communication with a tank the air escaping through the top; (2) emptying the same through the base with a view to feeding the consuming apparatus the air re-entering through the top; and (3) effecting connection through the base between two of the tubes, the level of the liquid in which differs and one of which communicates through the top with the atmosphere, and the other with a gauge, so as to indicate by the deviation of the needle of the latter, the amount of drop between the original level and the final level, of the liquid which drop indicates the specific delivery.

The present invention consists in an apparatus comprising two to four non-horizontal fixed volumetric tubes, operating as above described, by means of two distributors which rotate synchronously.

The accompanying drawings illustrates the invention.

Fig. 1 is a section through the axis of the apparatus.

Fig. 2 is a vertical section on line 2—2 of Fig. 9 showing one position of the distributors.

Fig. 3 is a view similar to Fig. 2 showing another position of the distributors.

Fig. 4 is a section on line 4—4 of Fig. 1 and illustrating a member for driving the distributor.

Fig. 5 is a horizontal section of the upper distributor.

Fig. 6 is a horizontal section of the lower distributor.

Fig. 7 is a section of the upper part of the apparatus taken through the axis of the distributor.

Fig. 8 is a top view of the apparatus with the cover removed.

Fig. 9 is a horizontal section on line 9—9 of Fig. 1.

Fig. 10 is a section on line 10—10 of Fig. 1 seen from below.

Four volumetric tubes 61, 62, 63 and 64 are arranged circularly around a vertical axis and are immersed to the level 39 in the liquid to be measured contained in the tank 41

These tubes are connected at the bottom to a lower plate 7 and at the top to an upper plate 26. The lower and upper plates are provided with as many junction holes as there are tubes.

Two distributors 17 and 5 rotate synchronously and control the operation of the tubes. These distributors are connected mechanically by the shaft 1 the ends of which carry the pinions 2 and 3 which mesh with the gear 4 of the upper distributor 17 and a gear $4^1$ of the lower distributor.

The lower distributor 5 has four ports arranged circularly round the central pivot ring 6. The distance between two ports is kept a little greater than the diameter of the ports so as to render the liquid completely stationary between two successive operations with a view to preventing the oscillatory movements of the liquid. The central pivot ring 6 is bored to form a communication between the central hole of the distributor and the horizontal conduit $7^1$ of the plate 7, the bell 42, the conduit 8, tube 9 and the evacuation tube 10. Two channels 11 and 12 are provided in the thickness of the distributor itself and form communication, one, 11, of the central hole with the orifice 13 for emptying the tubes, the other, 12, with the two orifices of comparison through communicating chambers 14 and 15.

The section of the conduit 12 is selected by experiment and is sufficiently small to prevent the formation of an oscillatory movement at the moment of the operation in which the position of the parts is shown in Fig. 3.

The upper distributor 17 also has four ports arranged circularly round its central point. In the upper distributor illustrated in Fig. 5, the three orifices 18, 19 and 20 cause the top of the volumetric tubes to communicate with the atmosphere by means of the ports of the upper plate 26 through upper chamber 22 and the interstices in the cover 23. The orifice 21 causes one of the volumetric tubes to communicate with a manometer shown diagrammatically at 70 (Fig. 7) by means of the channel 24, of the distributor the channel 25 of the upper plate 26, empty space provided in the member 27 and the metal tube 28. The manometer is suitably calibrated so as to read in miles per gallon or gallons per mile.

In order to offer the least possible resistance to the flow of the fluids, liquid and air, and to prevent losses through want of tightness in the distributors it is necessary that the resistance to the flow of air in the upper distributor and of the liquid in the lower distributor should be as low as possible.

This result is obtained by selecting the sections of the ports of the distributors so that they are inversely proportional to the square root of the specific weights of the densities of the fluids in question (air about 1.29, liquid fuel about 800.9). The diameters of the ports should bear the relationship between them that the square root of these figures show, about as the numbers 1 to 25.

The two distributors are adjusted so as to fit in a fluid-tight manner on their seats and are applied on their seats by means of springs 29 and 30 and balls 31 and 32.

The metal of the distributors and of the plates is such that they can turn on one another without gripping and without becoming oxidized even in the absence of any lubrication, for example nickel and rustless chromated steel.

The abutment 33 prevents any possibility of play of the lower distributor.

The liquid fuel is fed through the tubes 34 and 35 the conduits 36 and 37 and the seat of valve 38, the level of the liquid being maintained practically constant in the apparatus by the float 40 which controls the feed of the liquid. The vessel 41 forms a compensation tank which is necessary at the moment of a sudden change of rate. If, for instance, a much larger delivery of liquid is suddenly required of the apparatus, the vessel 41 will instantly deliver this extra liquid until the liquid in the supply tube 34 has picked up enough speed for its delivery to be satisfactory. If on the contrary, the requirement of liquid is abruptly stopped, the vessel 41 stores up the liquid which continues to issue from the supply tube 34 until the needle-valve 38 of the float 40 shuts off the supply of liquid.

In the absence of the vessel 41 the filling level in the volumetric tube would be affected by these excessive or inadequate supplies of liquid and would so give false indications for one or two seconds.

Arranged in the bell 42 is the float 43, which ensures the closing of the passage 44, in case the volumetric arrangement is working at a normal rate and the opening of this passage in case of a specific consumption beyond the measuring capacity of the apparatus in which case the lower part of an air cushion formed in tube 45 empties while effecting an intake of air through the orifice 46, Figs. 1, 2 and 3, then the air drawn in through the conduit $7^1$ gradually fills the bell 42 until the float 43 sinks and its needle 47 uncovers the auxiliary feed passage 44.

The above described air cushion becomes formed as the hole 46 is practically as fine as a hair, so that the tube 45 acts as an air cushion when the apparatus rotates rapidly, that is to say at the moment that the air cushion becomes necessary. At this moment the air has no longer time to enter and go out through the fine hole 46 because of the resistance offered by this hole to the passage of the air. The hole has been shown larger in the drawings for the purpose of clearness.

The air cushion branched on the tube $7^1$ deadens the shocks at the moment of opening the ports of the lower distributor which might lift the latter from its seat and falsify the operation of the device through the leakage.

The drive of the distributors is effected by means of a flexible shaft of the kind employed in motor cars for actuating speedometers. The flexible shaft is soldered to the fork 48. The worm 49 integral with the fork 48 engages with the gear 50 which carries a square 51 at the end of its shaft which drives the square 53 at the end of the shaft 1 by means of the square coupling sleeve 52.

With reference to Fig. 7 the degree of vacuum in the empty space provided in the member 27 is controlled by a porous joint 54 constituted for example by a vegetable tissue and of which the resistance to the passage of the air may be regulated by the regulating screw 55.

A very light current of air regulatable as required passes by the threads of the screw 56 which is not provided with any joint and penetrates by the imperfect joint 54 into the conduits leading to the manometer.

This very slightly entry of air is intended to serve two purposes; firstly it enables the needle of the manometer to return to zero, which otherwise would not happen, and secondly it creates a slight circulation of air from the manometer which drives into the apparatus any liquid which might be in the air duct and which would falsify the indication.

The hole 57 Fig. 1, in the tank 41 forms an overflow which prevents the liquid invading the upper distributor in case the float fails to operate.

Two of the opposite volumetric tubes 62 and 64, for example could be omitted. The measuring operations are effected in the following manner it being only necessary to describe the operations with reference to two tubes, say tubes 61 and 63.

The tube 61 (Fig. 2) is filled from the bottom more or less, according to the speed of rotation of the distributors, with liquid from the tank 41.

The tube 63 is then emptied from the bottom, by means of the orifice 13, channel 11, the conduits 7¹ and 8 and through the tube 10 leading to the carburetter, of a part of its contents, which corresponds to the consumption for ten metres travel of a motor boat or other vehicle, while air re-enters at the top. The conduit 7¹ is always in communication with the tube 45.

Fig. 3 illustrates the operations which follow; the two distributors having each moved through a quarter of a revolution in the direction of the hands of a watch. The two tubes the one 61 full and the other empty communicate at the base by means of the conduit 12 of the lower distributor 5. The air imprisoned in the upper part of the tube 61 communicates with the vacuum meter through the conduits 24 and 25 and the metal pipe 28 while the tube 63 communicates at the top with the atmosphere.

The volume wanting, corresponding to the specific feed is expressed by the difference of level in the tubes 61 and 63 and by the corresponding depression of the vacuum meter.

As the distributors move round constantly in the clockwise direction each of the two tubes 61 and 63 works successively at each of the operations in the order; filling, comparison, emptying, comparison.

It can be seen that the apparatus will function with only two tubes but to obtain an action without interruptions the two other tubes 62 and 64 are provided in which case as the two tubes 61 and 63 operate as has been described with reference to Fig. 2 and the tubes 62 and 64 will operate as described with reference to Fig. 3 then when the tubes 61 and 63 work as in Fig. 3, the tubes 62 and 64 will be working as in Fig. 2.

The apparatus is suitable of application to various purposes where it is required to ascertain fuel or other liquid consumption, for instance in marine engines to measure the amount of crude oil consumed for each ten metres of distance travelled; in thermoelectric groups (Diesel and others) to measure the amount of crude-oil or petroleum per second kilowatt delivered, or in motor cars the fuel used per each ten metres travelled.

What I claim as my invention and desire to secure by Letters Patent of the United States is:—

1. In apparatus for continuously indicating the consumption of a liquid, the combination of vertical volumetric tubes, an upper plate having orifices with which the upper extremities of said tubes are in communication, a lower plate having orifices with which the lower extremities of said tubes are in communication, a rotary valve member mounted on said upper plate effecting selective communication of the tops of said volumetric tubes with the atmosphere through said orifices in said upper plate, liquid supply for said tubes, a rotary valve member mounted on the lower plate effecting selective communication of the lower extremities of said volumetric tubes with said liquid supplying means and with one another, and means for rotating said rotary valve members synchronously.

2. In apparatus for continuously indicating the consumption of a liquid, the combination of a tank, an inlet valve thereto, means for supplying liquid to said tank through said valve, a float regulating the flow of liquid through said valve and maintaining the level of the liquid in the tank constant, a group of four volumetric tubes, an upper plate having four orifices with which the upper extremities of said tubes are in communication, a lower plate having four orifices with which the lower extremities of said tubes are in communication, a rotary valve member mounted on said upper plate, a liquid supply for said tubes, a rotary valve member mounted on the lower plate effecting selective communication of the lower extremities of said volumetric tubes with said liquid supply and with one another, means for rotating said rotary valve members synchronously and means for delivering the liquid from said tank to the source of consumption of said liquid.

3. In apparatus for continuously indicating the consumption of a liquid the combination of vertical volumetric tubes, an upper plate having a central orifice and four ports concentric with said orifice with which the upper extremities of said tubes are in communication, a lower plate having a central orifice and four ports concentric with said orifice with which the lower extremities of said tubes are in communication, a gauge, a rotary valve member having a central orifice and four ports concentric therewith mounted on said upper plate effecting selective communication of the tops of said volumetric tubes with the atmosphere and said gauge, means for supplying liquid to said tubes, a rotary valve member having a central orifice and four ports concentric therewith mounted on the lower plate, one of said ports communicating with said last mentioned central orifice and two other of said ports communicating with one another by a passage in said rotary valve member, the distance between each port being greater than the diameter of a port, springs applying the rotary valve members on the respective plates, and means for rotating said valve members synchronously.

4. In apparatus for continuously indicating the consumption of a liquid, the combination of a tank, means for supplying liquid thereto, means for delivering liquid therefrom, mechanism within said tank comprising volumetric tubes, an upper plate, a lower plate, a rotary valve member mounted on said upper plate, a rotary valve member mounted on said lower plate, a float maintaining the liquid at a constant level in said tank, a safety float adapted to closed an auxiliary feed inlet, a mounted tube forming an air cushion, means for rotating said rotary valve members synchronously and an overflow orifice in said tank, all substantially as described.

In witness whereof I have signed this specification.

WILLIAM EMILE FAVRE.